(12) United States Patent
Bhatnagar et al.

(10) Patent No.: US 7,764,692 B1
(45) Date of Patent: Jul. 27, 2010

(54) BYPASS OF ROUTING PROTOCOL FILTERING IN A MULTI-SUBNET NETWORK

(75) Inventors: Shailendra Bhatnagar, Apex, NC (US); Antonio V. Casanova, Morrisville, NC (US); Konstantin G. Kostenko, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 12/186,339

(22) Filed: Aug. 5, 2008

(51) Int. Cl.
*H04L 12/56* (2006.01)
(52) U.S. Cl. .................. 370/392; 370/465; 709/245
(58) Field of Classification Search .......... 370/352, 370/353, 354, 355, 356, 389, 390, 392, 393, 370/400, 401, 428, 465, 466, 474, 475, 476; 709/245, 246; 726/11, 12, 13, 14
See application file for complete search history.

(56) References Cited

U.S. PATENT DOCUMENTS

| | | | |
|---|---|---|---|
| 5,570,084 A * | 10/1996 | Ritter et al. ............ | 370/338 |
| 5,920,699 A | 7/1999 | Bare .................... | 395/200.55 |
| 6,243,759 B1 * | 6/2001 | Boden et al. ........... | 709/238 |
| 6,249,801 B1 * | 6/2001 | Zisapel et al. .......... | 718/105 |
| 7,058,007 B1 * | 6/2006 | Daruwalla et al. ....... | 370/216 |
| 2002/0003780 A1 * | 1/2002 | Braun et al. ........... | 370/254 |
| 2004/0117339 A1 * | 6/2004 | Thubert et al. ......... | 707/1 |
| 2004/0249974 A1 * | 12/2004 | Alkhatib et al. ......... | 709/245 |
| 2005/0147097 A1 * | 7/2005 | Chari et al. ............ | 370/392 |
| 2005/0232261 A1 * | 10/2005 | Wybenga et al. ........ | 370/389 |
| 2006/0075139 A1 * | 4/2006 | Jungck ................. | 709/245 |
| 2009/0041044 A1 * | 2/2009 | Giles .................... | 370/401 |
| 2009/0129398 A1 * | 5/2009 | Riegel et al. ............ | 370/401 |
| 2009/0327392 A1 * | 12/2009 | Tripathi et al. ........... | 709/201 |

OTHER PUBLICATIONS

Kemyst.com, CLI Guide, dated May 1, 2002, 17 pgs.
Kemyst.com, dated May 22, 2002, 1 pg.
RFC 768—User Datagram Protocol, dated Aug. 28, 1980, 6 pgs.
RFC 894—A Standard for the Transmission of IP Datagrams over Ethernet Networks, dated Apr. 1984, 6 pgs.
RFC 1058—Routing Information Protocol, dated Jun. 1988, 50 pgs.
RFC 1388—RIP Version 2 Carrying Additional Information, dated Jan. 1993, 10 pgs.
RFC 1723—RIP Version 2 Carrying Additional Information, dated Nov. 1994, 12 pgs.
RFC 1918—Address Allocation for Private Internets, dated Feb. 1996, 15 pgs.
RFC 2453—RIP Version 2, dated Nov. 1998, 56 pgs.
STD 56, dated Nov. 1998, 68 pgs.

* cited by examiner

*Primary Examiner*—Chi H. Pham
*Assistant Examiner*—Kevin Mew
(74) *Attorney, Agent, or Firm*—Brinks Hofer Gilson & Lione

(57) ABSTRACT

In one embodiment, an apparatus may replace a first address included in a source address of a first routing protocol packet with a second address. The first address may identify a source router and the second address may identify an integrated router. The source address may indicate where the first routing protocol packet originated. The apparatus may also generate a second routing protocol packet that indicates a subnet of the source router is reachable by the integrated router. The apparatus may further transmit the first routing protocol packet and the second routing protocol packet to the integrated router.

20 Claims, 5 Drawing Sheets

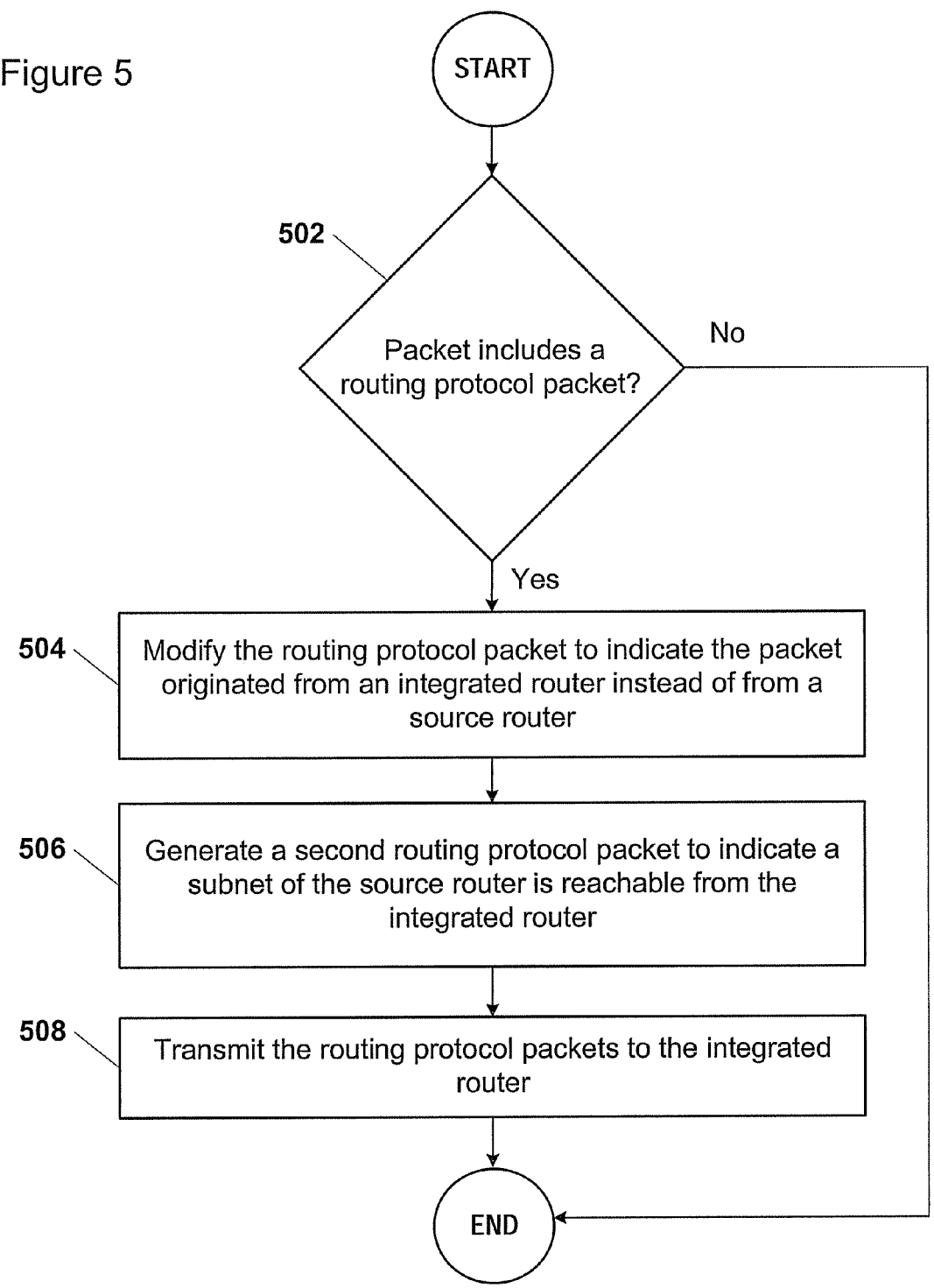

BYPASS OF ROUTING PROTOCOL FILTERING IN A MULTI-SUBNET NETWORK

TECHNICAL FIELD

The present disclosure relates generally to networks.

BACKGROUND

A routing protocol is a protocol that specifies how routers communicate with each other in order to disseminate information so that the routers may select routes between any two nodes on a network. In many examples, each router has a prior knowledge of the router's immediate neighboring routes, but not of other routes. Routers may share information about the neighboring routes with other routers using a routing protocol so that routers have knowledge of the network topology at large. Examples of routing protocols include Routing Information Protocol (RIP), Open Shortest Path First (OSPF), Interior Gateway Routing Protocol (IGRP), Intermediate System to Intermediate System (IS-IS), Enhanced Interior Gateway Routing Protocol (EIGRP), Intermediate system to intermediate system (Exterior Gateway Protocol (EGP), Border Gateway Protocol (BGP), and Constrained Shortest Path First (CSPF).

A packet is a formatted block of data for transmission over a communications network. A routing protocol packet is a packet formatted in accordance with a routing protocol. Routing protocol packets may be, for example, multicast or broadcast. Consequently, routing protocol packets may add up to a large amount of network traffic on networks with a large number of routers. Furthermore, routers may sometimes be deliberately or inadvertently configured to transmit routing protocol packets with misleading information.

For at least these reasons, Internet Service Providers (ISP) may sometimes use filters to block routing protocol packets. For example, an ISP may block routing protocol packets sent from any subnet not within a determined set of subnets. When a customer of an ISP wants to make devices available on a particular subnet, the customer may ask the ISP to add the particular subnet to the determined set of subnets.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 5 illustrates one embodiment of a method to bypass routing protocol filtering.

DESCRIPTION OF EXAMPLE EMBODIMENTS

Overview

Figure 1:
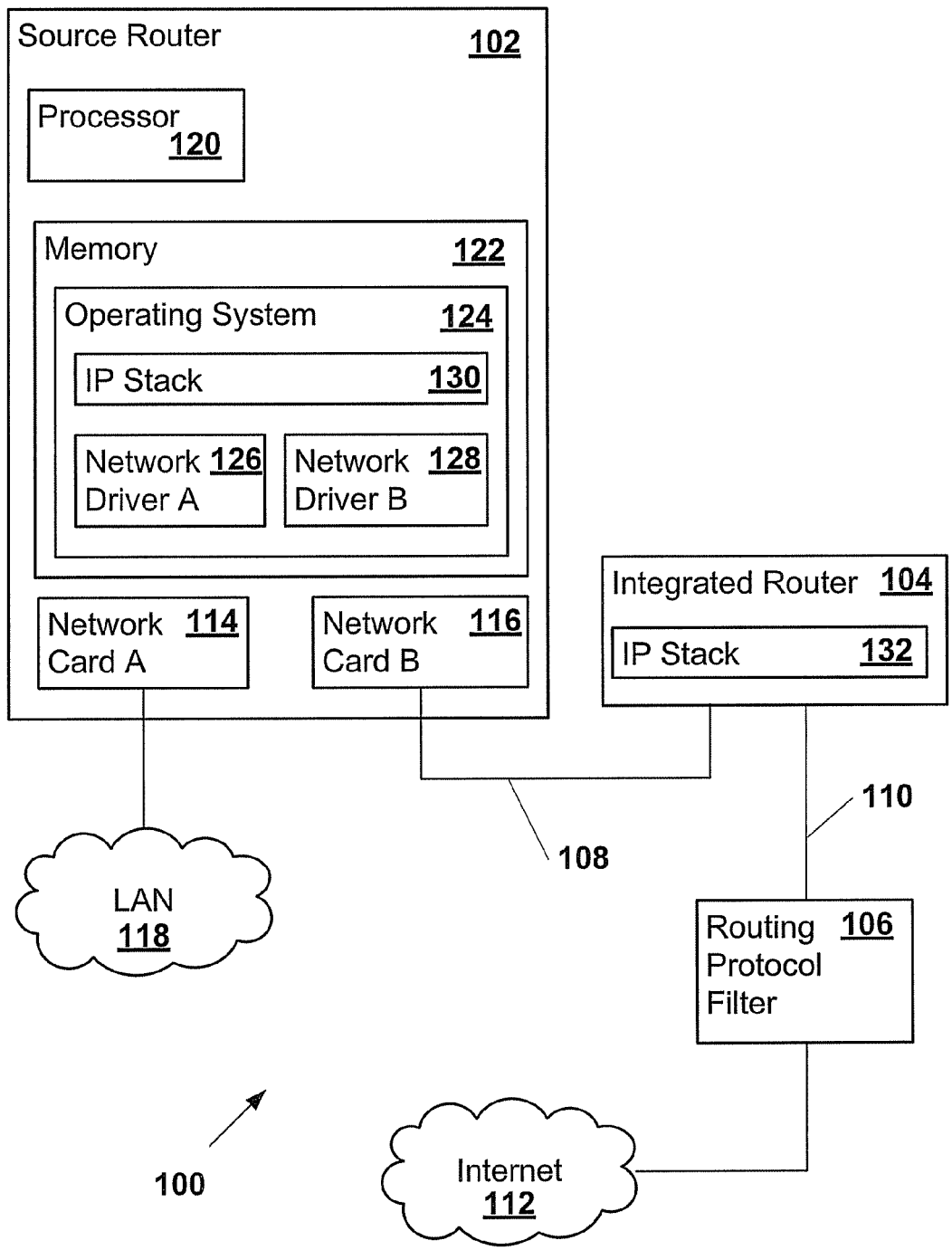
FIG. 1 illustrates one embodiment of a system to bypass routing protocol filtering in a multi-subnet network.

By way of introduction, the example embodiments described below include an apparatus, logic encoded in a computer readable media, and a method to bypass routing protocol filtering.

According to a first embodiment, an apparatus replaces a first address included in a source address of a first routing protocol packet with a second address. The first address identifies a source router and the second address identifies an integrated router. The source address indicates where the first routing protocol packet originated. The apparatus also generates a second routing protocol packet indicating a subnet of the source router is reachable by the integrated router. The apparatus further transmits the first routing protocol packet and the second routing protocol packet to the integrated router.

In a second embodiment, logic encoded in a tangible media is provided. The logic when executed modifies a first routing protocol packet to indicate that the first routing protocol packet originated from an integrated router instead of from a source router. The logic when executed also generates a second routing protocol packet. The second routing protocol packet includes a route entry and indicates that a subnet of the source router is reachable by the integrated router. The logic when executed additionally transmits the first routing protocol packet and the second routing protocol packet to the integrated router.

In a third embodiment, a method is provided. Whether a packet includes a first routing protocol packet is determined. The first routing protocol packet is modified to indicate that the first routing protocol packet originated from an integrated router instead of from a source router. A second routing protocol packet is generated that indicates a subnet of the source router is reachable from the integrated router. The first routing protocol packet and the second routing protocol packet are transmitted to the integrated router.

The present invention is defined by the following claims, and nothing in this section should be taken as a limitation on those claims. Further aspects and advantages of the invention are discussed below in conjunction with the example embodiments.

Example Embodiments

As discussed earlier, an Internet Service Providers (ISP) may sometimes use filters to block routing protocol packets. For example, an ISP may block routing protocol packets sent from any subnet not within a determined set of subnets. The process of getting an ISP to make customer provided equipment devices available on a particular subnet by adding the particular subnet to the determined set of subnets may be time consuming or otherwise objectionable. Therefore, it may be desirable to bypass the filtering of the routing protocol packets.

In one embodiment, a system to bypass routing protocol filtering may include a customer provided equipment (CPE) router, a cable modem, and a cable modem termination system (CMTS). The CPE router may include a High Speed WAN Interface Card (HWIC) in communication with the cable modem over a fast Ethernet connection. The CPE router may also include a network driver to communicate with the HWIC. The cable modem may be in communication with the CMTS over Hybrid Fiber-Coaxial (HFC). The CPE router, the cable modem, and the CMTS may support RIP. The CMTS may filter routing protocol packets by blocking RIP packets sent from a subnet not in a determined set of subnets.

The CPE router may include additional network cards and corresponding network drivers. RIP packets may be sent by an Internet Protocol (IP) protocol stack of the CPE router to the network drivers. If the HWIC is on a different subnet than the subnet of the cable modem, the network driver of the HWIC may modify a RIP packet before transmitting the RIP packet to the cable modem. The network driver of the HWIC may modify the RIP packet so that the RIP packet appears to originate from the cable modem instead of from the CPE router.

When the cable modem receives the modified RIP packet, the cable modem may retransmit the RIP packet to the CMTS. Because the RIP packet appears to originate from the cable modem instead of the CPE router, the CMTS will not filter the RIP packet.

In one example, the network driver of the HWIC may additionally generate and transmit a second RIP packet to the cable modem. The second RIP packet may indicate that the subnet of the HWIC is reachable by the cable modem. The network driver may generate the second RIP packet to appear as if the second RIP packet originated from the cable modem instead of from the CPE router. The RIP packet and the additional RIP packet may be sent one right after the other, with a delay between the transmission of each of the two packets, and in any order.

FIG. 1 illustrates one embodiment of a system 100 to bypass routing protocol filtering in a multi-subnet network. The system 100 may include a source router 102, an integrated router 104, and a routing protocol filter 106. The system 100 may include additional, different, or fewer components.

The source router 102 may be any router that generates routing protocol packets. A router is a device or combination of devices that includes two or more network cards and connects two or more logical subnets by receiving and transmitting packets. The logical subnets may, or may not, map one-to-one to the network cards of the router. A network card or network interface card is a device that includes both hardware and software to enable a processor in communication with the network card to communicate over a network. A network card provides physical access to a network and provides a low-level addressing system through use of Media Access Control (MAC) addresses. A subnet is a set of devices on a network that have a common IP address routing prefix. Each of the devices on the network may be identified by an IP address. A routing prefix is a sequence of leading bits of an IP address that precede a portion of the address that is used to identify the devices within the subnet. A router may contain an operating system, such as Cisco's Internetwork Operating System (IOS), Juniper Network's JUNOS and JUNOSe or Extreme Networks' XOS.

An integrated router 104 may be any router that is coupled with the source router 102 over a physical link 108. A device is said to be coupled to another device if electrical signals may be transmitted between the two devices using one or more electrical, optical, or any other type of connection now known or later discovered that is capable of transmitting a signal. Examples of an integrated router 104 include a cable modem, a computer configured as a router, or any other router.

The physical link 108 may be any type of connection capable of transmitting a signal. For example, the physical link 108 may be an Ethernet cable, a Fast Ethernet cable, or any other type of cabling. In another example, the physical link 108 may be a wireless connection. In one example, the integrated router 104 may be included in a form factor that also includes the source router 102. For example, the integrated router 104 may be a cable modem included in the source router 102. In a different example, the integrated router 104 may be included in a different form factor than the source router 102. For example, the integrated router 104 may be a cable modem that is a unit separate from the source router 102. In such an example, the source router 102 may include a HWIC that is connected with a Fast Ethernet cable to the integrated router 104, which is the separate cable modem.

The integrated router 104 may be in communication with the routing protocol filter 106 over a network 110. The routing protocol filter 106 may be any device that blocks transmission of routing protocol packets that do not originate from one or more determined subnets. For example, the routing protocol filter 106 may be a Cable Modem Termination System (CMTS), a specially configured router, or any other device that is configured to block routing protocol packets. The network 110 may be a Local Area Network (LAN), a Wireless Local Area Network (WLAN), a Personal Area Network (PAN), a Wide Area Network (WAN), or any other now know or later developed communications network. For example, the network 110 may include Hybrid Fiber-Coaxial (HFC) line, Ethernet cable, or a combination thereof. The routing protocol filter 106 may block the transmission of the routing protocol packets to another network such as the Internet 112.

The source router 102 may include two or more network cards 114 and 116, a processor 120, and a memory 122. The source router 102 may include additional, fewer, or different components.

A first network card 114 may be connected to a network, such as a LAN 118. A second network card 116 may connect the source router 102 to the integrated router 104 over the physical link 108.

The processor 120 may be in communication with the memory 122. In one example, the processor 120 may also be in communication with additional components, such as the network cards 114 and 116. The processor may be a general processor, central processing unit, server, application specific integrated circuit (ASIC), digital signal processor, field programmable gate array (FPGA), digital circuit, analog circuit, or combinations thereof. The processor 120 may be one or more devices operable to execute computer executable instructions to route packets from one subnet to another, and to generate routing protocol packets. For example, the processor 120 may include a first central processing unit in communication with a second central processing unit included in one of the network cards 114 and 116. In other examples the processor 120 may not include a central processing unit of one of the network cards 114 and 116. In yet a different example, the processor 120 may be one central processing unit of one of the network cards 114 and 116.

The memory 122 may be any now known, or later discovered, data storage device. The memory 122 may be a non-volatile and/or volatile memory, such as a random access memory (RAM), a read-only memory (ROM), an erasable programmable read-only memory (EPROM), or flash memory. The memory 122 may include an optical, magnetic (hard-drive) or any other form of data storage device. In some examples, the memory 122 may not be included in one or more network cards 114 and 116. In other examples, the memory 122 may be included in one or more network cards 114 and 116. In still other examples, the memory may be both included and not included in the network cards 114 and 116.

The memory 122 may include computer code. The computer code may include instructions executable with the processor 120. The computer code may include logic embedded in the instructions. The computer code may be written in any computer language now known or later discovered, such as C, C++, assembly language, C#, Java, Pascal, Visual Basic, Perl, HyperText Markup Language (HTML), JavaScript, and any combination thereof.

The computer code may include an operating system 124. The operating system 124 is responsible for the management and coordination of activities and the sharing of the resources of a router. The operating system may act as a host for application programs that are executed on the router. As a host, one of the purposes of the operating system 124 is to handle details of the operation of hardware. For example, the operating system 124 may include a network driver 126 and 128 corresponding to each respective one of the network cards 114 and 116. The network driver 126 and 128 is software that handles communication between the operating system 124 and the network card 114 and 116. The network driver 126 and 128 may be specific to the network card 114 and 116.

In addition to an operating system 124, the computer code may also include an IP protocol stack 130. The IP protocol stack 130 is a software layer to perform a task of getting packets of data from a source to one or more destinations based on an IP address. Routing protocol packets may be generated by the IP protocol stack 130. Like the source router 102, the Integrated router 104 may also include an IP protocol stack 132.

During operation, the processor 120 of the source router 102 may modify a routing protocol packet to be sent to the integrated router 104 so that the routing protocol packet appears to originate from the integrated router 104 instead of from the source router 102. The processor 120 may additionally generate and transmit an additional routing protocol packet to the integrated router 104. The additional routing protocol packet may indicate that the subnet of the network card 116 coupled to the integrated router 104 is reachable by the integrated router 104. The processor 120 may generate the additional routing protocol packet to appear as if the additional routing protocol packet originated from the integrated router 104 instead of from the source router 102.

In a different example, the processor 120 may modify the first routing protocol packet to indicate that the subnet of the network card 116 coupled to the integrated router 104 is reachable by the integrated router 104. In such an example, the additional routing protocol packet may be superfluous.

The processor 120 may generate routing protocol packets for transmission from each of the network cards 114 and 116 of the source router 102. However, the processor 120 may modify routing protocol packets to be transmitted via the one network card 116 that is coupled to the integrated router 104, and not modify the routing protocol packets to be transmitted via other network cards 114 included in the source router 102.

In one example, the software code to modify the routing protocol packet, generate the additional routing protocol packet, or both may be included in the network card 116 coupled to the integrated router 104. In other examples, this software code may be included elsewhere in the memory 122.

The processor 120 may check each packet to be transmitted via the network card 116 that is coupled to the integrated router 104 in order to determine whether the packet is a routing protocol packet. For example, RIP packets are sent as User Datagram Protocol (UDP) packets to port 520. Therefore, the processor 120 may check whether the packet is a UDP packet sent to port 520 in order to determine whether the packet is a RIP packet. Additionally or alternatively, the processor 120 may further analyze the packet to verify that the packet is a RIP packet.

The processor 120 may be optionally configured to check for and modify the routing control packet. In one example, the processor 120 may be manually configured, such as with commands transmitted to the source router 102. In a second example, configuration of the processor 120 may be automated. For example the processor 120 may compare the subnet of the integrated router 104 with the subnet of the network card 116 coupled to the integrated router 104. If the subnets are different, then the processor 120 may be configured to perform the check for and the modification of the routing control packet. If the subnets are the same, then the processor 120 may be configured to skip the check for and the modification of the routing control packet.

How the processor 120 may modify a routing protocol packet to appear to originate from the integrated router 104 and how the processor 120 may generate the additional routing protocol packet is described below in reference to FIGS. 2-4.

Figure 2:
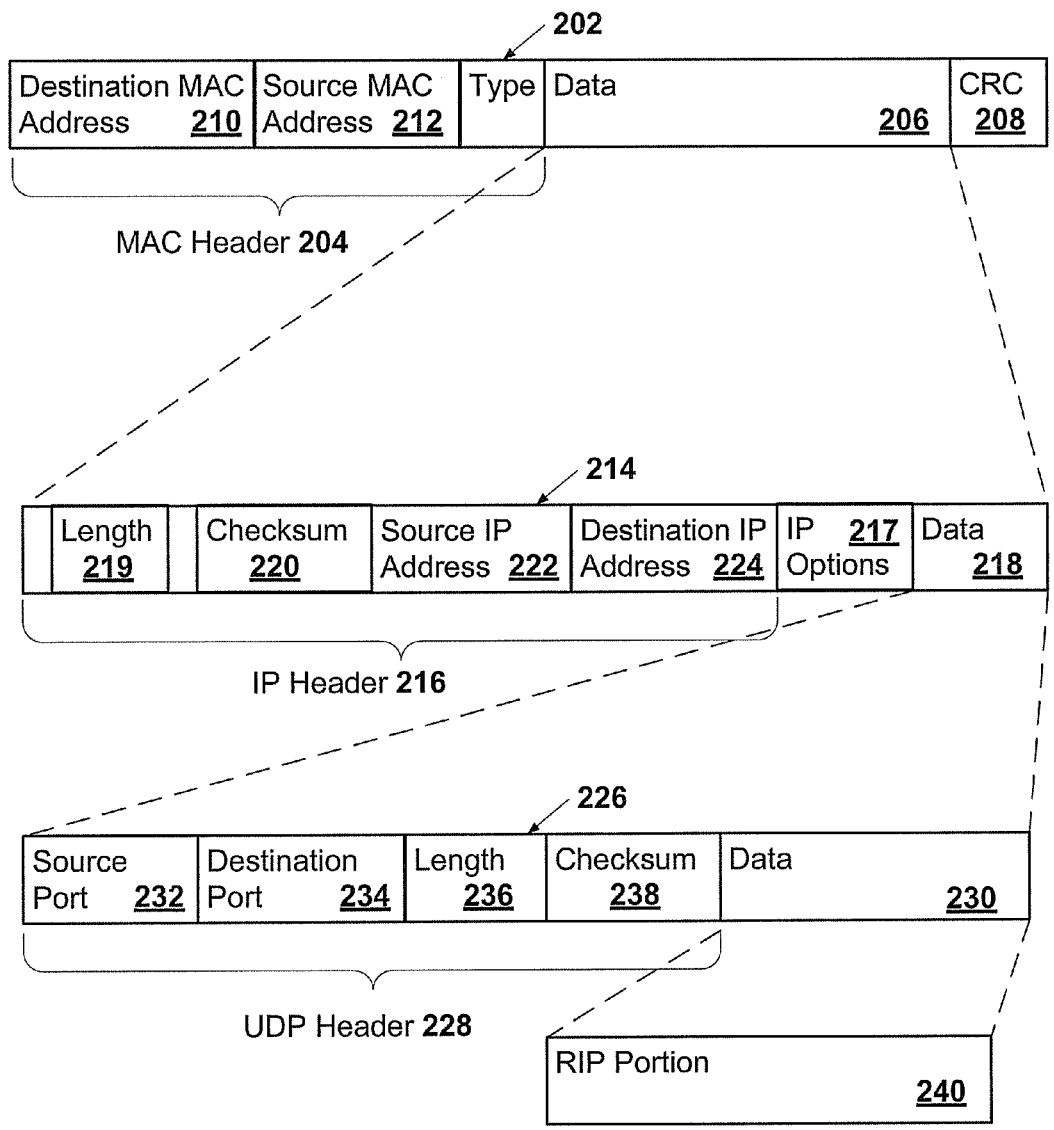
FIG. 2 illustrates an example of a routing protocol packet.

FIG. 2 illustrates an example of a routing protocol packet 202. The example routing protocol packet 202 in FIG. 2 includes a RIP packet. The routing protocol packet 202 may include a Medium Access Control (MAC) header 204, data 206, and a Cyclic Redundancy Check (CRC) 208. The CRC 208 is a number calculated based on the data 206. The number may be recalculated upon receipt of the routing protocol packet 202 in order to detect errors in the received data 206. The MAC header 204 may include a destination MAC address 210 and a source MAC address 212. A MAC address may be a globally unique number associated with a network card 114 and 116. An example of a MAC address is "00-08-74-4C-7F-1D." The destination MAC address 210 is a MAC address that indicates one or more destinations of the routing protocol packet 202. The source MAC address 212 is a MAC address that indicates where the routing protocol packet 202 originated. The data 206 of the routing protocol packet 202 may include an IP portion 214.

The IP portion 214 may include an IP header 216, IP options 217, and data 218. The IP portion 214 may formatted in accordance with any IP standard, such as Requests for Comments (RFC) 894. The IP header 216 may include, for example, a length 219, a checksum value 220, a source IP address 222, and a destination IP address 224. An IP address is a numerical identification of a logical address that is assigned to a device participating in a network utilizing the Internet Protocol. Examples of an IP address include "192.168.100.1" (for IPv4) and "2001:db8:0:1234:0:567:1:1" (for IPv6). The source IP address 222 is an IP address that indicates where the routing protocol packet 202 originated. The destination IP address 224 is an IP address that indicates one or more intended destinations of the routing protocol packet 202. The length field 219 includes the length in bytes of the IP portion 214. The checksum value may be a 16-bit one's complement checksum of the IP header 216 and the IP options 217. The IP options 217 are options, padding or a combination thereof. The data 218 of the IP portion 214 may include a UDP portion 226.

The UDP portion 226 may include a UDP header 228 and data 230. The UDP portion may be formatted in accordance with any UDP standard, such as Requests for Comments (RFC) 768. The UDP header 228 may include a source port 232, a destination port 234, a length 236, and a checksum value 238. The source port 232 is an optional field and, when meaningful, the source port 232 indicates the port of a sending process. Thus, the source port 232 may be assumed to be the port to which a reply should be addressed in the absence of any other information. If the source port 232 is not used, a value of zero is inserted. The destination port 234 may have a meaning within the context of a particular destination IP address 224. The length 236 is a length in octets of the UDP portion 226 including the UDP header 228 and the data 230. The checksum value 238 may be the 16-bit one's complement of the one's complement sum of a pseudo header of the IP header 216, the UDP header 228, and the data 230 of the UDP portion 226, possibly padded with zero octets at the end to make a multiple of two octets. The pseudo header of the IP header 216 includes the source IP address 222, the destination IP address 224, a protocol field (not shown) in the IP header 216, and a length 219 in the IP header 216. If a computed value of the checksum 238 of the UDP header 228 is zero, the computed value is transmitted as all ones, which is the equivalent in one's complement arithmetic. Where the checksum 238 of the UDP header 228 is zero, the checksum 238 indicates that the transmitter generated no checksum. The data 230 of the UDP portion 226 may include a RIP portion 240. RIP portion 240 may be formatted in accordance with any RIP standard, such as RFC 1058, Internet Standard (STD) 56, RFC 1388, RFC 1723, and RFC 2453.

Figure 3:
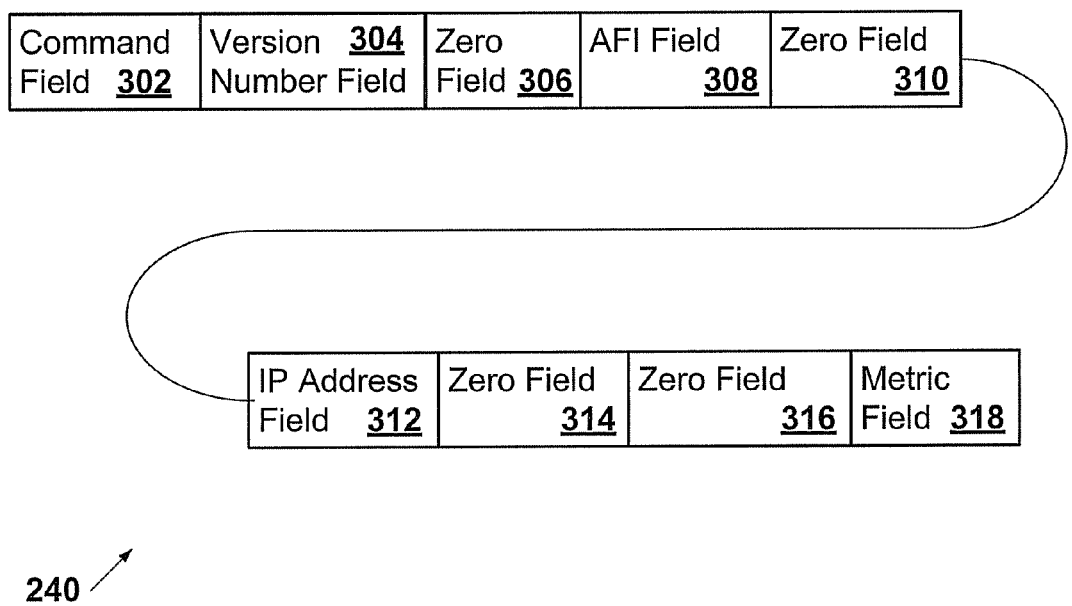
FIG. 3 illustrates an example of a RIP portion of a routing protocol packet formatted in accordance with RIP 1 (RFC 1058)

FIG. 3 illustrates an example of a RIP portion 240 of a routing protocol packet 202 formatted in accordance with RIP 1 (RFC 1058). A RIP compliant router sends routing-update messages at regular intervals and when network topology changes. When a router receives a routing update that includes changes to a route entry, the router updates the router's routing table to include the new route. After updating the router's routing table, the router begins transmitting routing updates to inform other routers of the change. These routing updates may be sent independently of regularly scheduled updates that a RIP compliant router sends.

A routing table, or Routing Information Base (RIB), is an electronic table or database that is stored in a router or a networked computer. The routing table may include route entries. A route entry identifies a path to a subnet. Each of the route entries may correspond to an available route from one subnet to another. In some examples, the route entries may include metrics associated with the routes. The information in the routing table describes the topology of the network immediately around the router. The route entry may be stored in any format in the routing table.

The RIP portion 240 may include a command field 302, a version number field 304, a first zero field 306, an Address Family Identifier (AFI) field 308, a second zero field 310, an IP address field 312, a third zero field 314, a fourth zero field 316, and a metric field 318.

The command field 302 indicates whether the routing protocol packet 202 is a request or a response. The request asks that a router send all or part of its routing table. A response may be an unsolicited regular routing update or a reply to a request. A response may include route entries.

The version number field 304 indicates the version of RIP used in the routing protocol packet 202. For a RIP 1 packet, the version number is 1.

The first zero field 306, the Address Family Identifier (AFI) field 308, the second zero field 310, the IP address field 312, the third zero field 314, the fourth zero field 316, and the metric field 318 correspond to one route entry. These fields may be repeated another 24 times so that one routing protocol packet 202 may include a total of 25 route entries. Multiple routing protocol packets 202 may be used to convey more than 25 route entries.

The first zero field 306, the second zero field 310, the third zero field 314, and the fourth zero field 316 are not used. These fields are used for compatibility pre-standard versions of RIP.

The AFI field 308 indicates the address family used in a route entry. RIP is designed to carry routing information for several different protocols. Each entry has an AFI to indicate the type of address being specified. The AFI for IP is two.

The IP address field 312 specifies an IP address of subnet in the route entry. The metric field 318 indicates how many internetwork hops (e.g., routers) have been traversed in the trip to the destination. A value for the metric field 318 is between 1 and 15 for a valid route, or 16 for an unreachable route.

Figure 4:
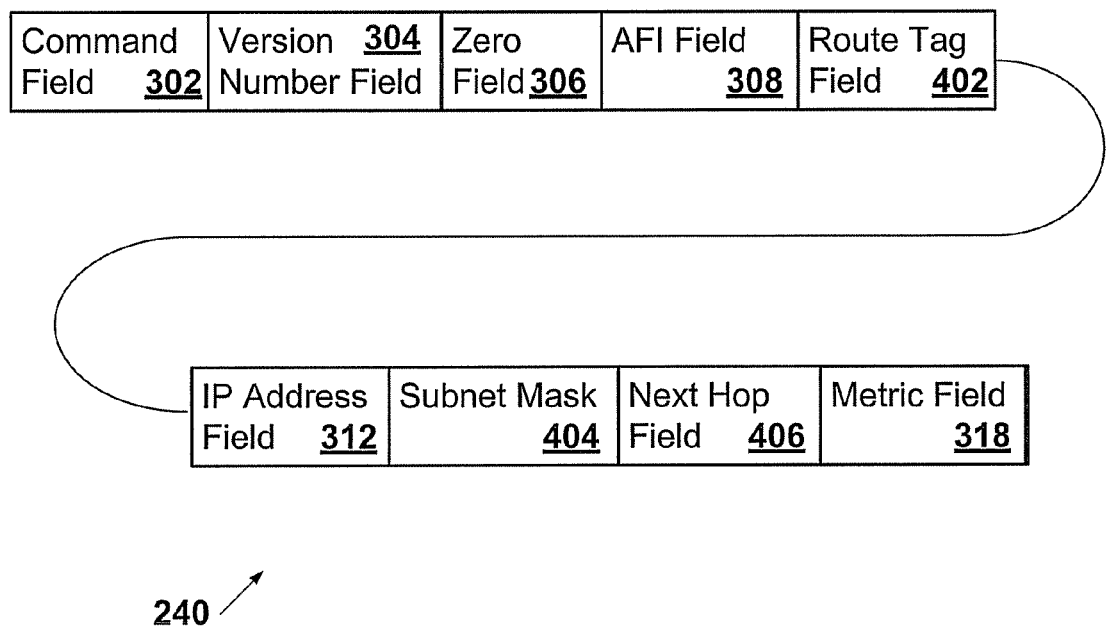
FIG. 4 illustrates an example of a RIP portion of a routing protocol packet formatted in accordance with RIP 2 (RFC 2453)

FIG. 4 illustrates an example of a RIP portion 240 of a routing protocol packet 202 formatted in accordance with RIP 2 (RFC 2453). The RIP portion 240 may include a command field 302, a version number field 304, a first zero field 306, an AFI field 308, a route tag field 402, an IP address field 312, a subnet mask field 404, a next hop field 406, and a metric field 318.

The command field 302, the version number field 304, the first zero field 306, the AFI field 308, the IP address field 312, and the metric field 318 correspond to the similarly named fields in FIG. 3. The value of the version number field 304 would be two for a RIP 2 compliant routing protocol packet 202. The first zero field 306, the AFI field 308, the route tag field 402, the IP address field 312, the subnet mask field 404, the next hop field 406, and the metric field 318 correspond to one route entry.

The route tag field 402 is used to distinguish between internal routes that are learned by RIP and external routes that are learned from other routing protocols.

The subnet mask field 404 includes a subnet mask which is applied to an IP address to yield the non-host portion of the IP address in a subnet identified by the IP address field 312. If the subnet mask field 404 is zero, then no subnet mask is associated with the corresponding route entry.

The next hop field 406 includes an IP address of an immediate next hop to which packets to the subnet indicated in the IP address field 312 should be forwarded. An address specified as a next hop should be directly reachable on a logical subnet over which an advertisement of the route entry is made.

Under RIP 2, the fields used for a route entry may be used for authentication instead. If the AFI field 308 has a value of 0xFFFF, then the memory otherwise used to store the route tag field 402, the IP address field 312, the subnet mask field 404, the next hop field 406, and the metric field 318 may be used to store authentication data.

During operation of a system 100 to bypass routing protocol filtering, the processor 120 may modify a routing protocol packet 202 so that the routing protocol packet 202 appears to originate from the integrated router 104. The processor 120 may replace the source MAC address 212 in the MAC header 204 with a MAC address of the integrated router 104. The processor 120 may also replace the source IP address 222 of the IP header 216 with the IP address of the integrated router 104. The processor 120 may further modify the routing protocol packet 202 by updating the checksum 238 of the UDP header 228 and the checksum of the IP header 216. The processor 120 may further modify the routing protocol packet 202 by updating the CRC 208.

The processor 120 may also advertise the route from the subnet of the integrated router 104 to the subnet of the network card 116 that is coupled to the integrated router 104. The unmodified routing protocol packet 202 may not include a route entry for this route between the integrated router 104 and the source router 102.

In one example, the processor 120 may generate an additional routing protocol packet 202 to include a route entry for this route. The processor 120 may make the additional routing protocol packet 202 appear to have originated from the integrated router. For example, the processor 120 may generate the additional routing protocol packet by copying the modified routing protocol packet 202 and replacing any route entries in the RIP portion 240 with one route entry for the route from the subnet of the integrated router 104 to the subnet of the network card 116 that is coupled to the integrated router 104. The processor 120 may then update any headers by recalculating any length field 219 and 236, checksum field 208, 220, and 238, or combination thereof.

The RIP portion 240 in the additional routing protocol packet 202 may be generated differently depending on the version of RIP. The processor 120 may use the value of the version number field 304 of the RIP portion 240 in the first routing protocol packet 202 to determine which format of RIP should be used. For example, for either version one or two, the processor 120 may store the subnet of the source router 102 in the IP address field 312. For version two, the processor 120 may store a subnet mask of the network card 116 that is coupled to the integrated router 104 in the subnet mask field 404. A subnet mask is not used for version one. The processor 120 may determine the subnet mask by a bitwise Boolean "and" operation of an IP address of the network card 116 that is coupled to the integrated router 104 and a default mask associated with the network class of that IP address. The default mask associated with the network class of an IP address may be determined in accordance with RFC 1918. For example, the default mask for IP addresses in the range of 172.16.0.0 to 172.31.255.255 is 255.240.0.0. The processor 120 may also determine the next hop field 406 for version two and the metric field 318 for any version. For example, the processor 120 may set the next hop field 406 to a value of "0.0.0.0" to indicate that the subnet indicated by the IP address field 312 of the route entry should be available via the originator of the routing protocol packet 202. The processor 120 may set the metric field 318 to a value of "1," for example.

The processor 120 may set the length 236 of the UDP header 228 and the length 219 of the IP header 216 of the additional routing protocol packet 202. The processor 120 may also set the checksum 238 of the UDP header 228 and the checksum 220 of the IP Header.

In some examples, instead of generating the additional routing protocol packet 202, the processor 120 may add the route entry to the modified routing protocol packet 202. Where the modified routing protocol packet 202 already includes a maximum number of route entries, an additional routing protocol packet 202 may be generated.

If the version of RIP used in the additional routing protocol packet 202 is a version that supports RIP authentication, such as version two, then the additional routing protocol packet 202 may include authentication information in the RIP portion 240. The processor may execute computer code stored in the memory 122 of the source router 102 to include the authentication information.

The processor 120 may obtain configuration information about the integrated router 104, the routing protocol filter, or a combination thereof using any way of obtaining configuration information now known or later developed. For example, the configuration information may be manually entered. Alternatively or in addition, the information may be obtained through communication with the integrated router 104. For example, the processor 120 may use Router Blade Control Protocol (RBCP) to obtain the configuration information from the integrated router 104. Examples of configuration information include an IP address of the integrated router 104, a MAC address of the integrated router 104, an IP subnet mask of the integrated router 104, an IP address of the routing protocol filter 106, a MAC address of the routing protocol filter 106, and any combination thereof.

In some examples, the integrated router 104 may be configured to optionally forward routing protocol packets 202. For example, a flag in the integrated router 104 may indicate whether the integrated router 104 forwards routing protocol packets 202 to the routing protocol filter 106, where the routing protocol packets 202 includes fields indicating that the routing protocol packets 202 originate from the integrated router 104.

FIG. 5 illustrates one embodiment of a method to bypass routing protocol filtering. Additional, different, or fewer acts may be performed. The acts may be performed in a different order than illustrated in FIG. 5.

In act 502 of the embodiment illustrated in FIG. 5, the operation may begin by determining whether a packet includes a routing protocol packet 202. For example, if checking for RIP packets, determining whether a packet includes a routing protocol packet 202 may include determining whether the packet is an IP packet that includes a UDP packet with a destination port 234 of the UDP header 228 set to the value "520". In other examples, a particular port, a particular broadcast address, or a combination thereof may indicate that the packet includes a particular kind of routing protocol packet 202.

If the packet does not include a routing protocol packet 202, then the operation may complete, leaving the packet unmodified. Alternatively, if the packet includes a routing protocol packet 202, then the operation may continue to act 504.

In act 504, the operation may continue by modifying the routing protocol packet 202 to indicate the routing protocol packet 202 originated from an integrated router 104 instead of from a source router 102. For example, the operation may include replacing a source Medium Access Control address 212 included in the routing protocol packet 202 with a Medium Access Control address of the integrated router 104. Additionally or alternatively, the operation may include replacing a source Internet Protocol address 222 included in the routing protocol packet 202 with an Internet Protocol address of the integrated router 104.

In act 506, the operation may continue by generating a second routing protocol packet 202 to indicate a subnet of the source router 102 is reachable from the integrated router 104. For example, generating the second routing protocol packet 202 may include copying header information 204, 216 and 228 from the first routing protocol packet 202 and replacing the route entries with a route entry that identifies the subnet of the source router 102. The second routing protocol packet 202 may be generated to indicate the second routing protocol packet 202 originated from the integrated router 104

The operation may continue in act 508 by transmitting the first routing protocol packet 202 and the second routing protocol packet 202 to the integrated router 104. When the integrated router 104 receives the routing protocol packets 202, the integrated router 104 may forward the packets to the routing protocol filter 106. Because the first routing protocol packet 202 and the second routing protocol packet 202 indicate the packets originated from the integrated router 104, the routing protocol filter 106 will not filter the packets or may respond differently than for a packet with indication the source 102.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as the instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. An apparatus comprising:
a memory; and
a processor in communication with the memory, the memory including computer code executable with the processor, wherein the computer code is configured to:
replace a first address included in a source address of a first routing protocol packet with a second address, wherein the first address is to identify a source router, the second address is to identify an integrated router, and the source address is to indicate where the first routing protocol packet originated;
generate a second routing protocol packet, wherein the second routing protocol packet is to indicate a subnet of the source router is reachable by the integrated router; and
transmit the first routing protocol packet and the second routing protocol packet to the integrated router.

2. The apparatus of claim 1, wherein each of the first routing protocol packet and the second routing protocol packet includes a Routing Information Protocol packet.

3. The apparatus of claim 1, wherein the computer code is further configured to set a second source address of the second routing protocol packet to the second address.

4. The apparatus of claim 1, wherein each of the first address and the second address includes an Internet Protocol address.

5. The apparatus of claim 1, wherein the computer code is further configured to determine a new checksum for the first routing protocol packet.

6. The apparatus of claim 1, wherein the computer code is further configured to copy header information from the first routing protocol packet to generate the second routing protocol packet.

7. The apparatus of claim 1, further comprising a network card, wherein the source router is in communication with the integrated router via the network card and the network card includes the processor and the memory.

8. Logic encoded in one or more tangible media for execution and when executed operable to:
modify a first routing protocol packet to indicate the first routing protocol packet originated from an integrated router instead of from a source router;
generate a second routing protocol packet to include a route entry, wherein the second routing protocol packet indicates a subnet of the source router is reachable by the integrated router; and
transmit the first routing protocol packet and the second routing protocol packet to the integrated router.

9. The logic of claim 8, wherein each of the first routing protocol packet and the second routing protocol packet includes a Routing Information Protocol packet.

10. The logic of claim 8, when executed also operable to detect the routing protocol packet from among a plurality of packets.

11. The logic of claim 8, when executed also operable to receive an Internet Protocol address of an integrated router and a Medium Access Control address of the integrated router.

12. The logic of claim 8, when executed also operable to replace a first Medium Access Control address included in a source address of a first routing protocol packet with a second Medium Access Control address, wherein the first Medium Access Control address identifies a source router, the second Medium Access Control address identifies an integrated router, and the source address indicates where the first routing protocol packet originated.

13. The logic of claim 8, when executed also operable to generate the second routing protocol packet in a format determined based on a value included in a version field of the first routing protocol packet.

14. A method comprising:
detecting whether a packet includes a first routing protocol packet;
modifying the first routing protocol packet to indicate the first routing protocol packet originated from an integrated router instead of from a source router;
generating a second routing protocol packet to indicate a subnet of the source router is reachable from the integrated router; and
transmitting the first routing protocol packet and the second routing protocol packet to the integrated router.

15. The method of claim 14, wherein each of the first routing protocol packet and the second routing protocol packet includes a Routing Information Protocol packet.

16. The method of claim 14, further comprising determining whether the source router and the integrated router are on different subnets.

17. The method of claim 16, wherein determining whether the source router and the integrated router are on different subnets comprises determining a subnet of the integrated router from information received from the integrated router.

18. The method of claim 14, wherein modifying the first routing protocol packet comprises:
- replacing a source Medium Access Control address included in the first routing protocol packet with a Medium Access Control address of the integrated router; and
- replacing a source Internet Protocol address included in the first routing protocol packet with an Internet Protocol address of the integrated router.

19. The method of claim 14, wherein generating the second routing protocol packet further comprises copying header information from the first routing protocol packet to the second routing protocol packet.

20. The method of claim 14, wherein generating the second routing protocol packet includes:
- determining the subnet of the source router from an Internet Protocol address of the source router and a subnet mask of the source router; and
- setting a Routing Information Protocol Internet Protocol address field of a Routing Information Protocol packet to the subnet of the source router, wherein the Routing Information Protocol packet is included in the second routing protocol packet.

* * * * *